(12) United States Patent
Verdier

(10) Patent No.: US 6,338,566 B1
(45) Date of Patent: Jan. 15, 2002

(54) FLEXIBLE STOP PIECE FOR LIMITING ANGULAR TRAVEL, ARTICULATED SYSTEM COMPRISING SUCH A STOP PIECE, AND MEDICAL EQUIPMENT COMPRISING SUCH AN ARTICULATED SYSTEM

(75) Inventor: Alain Verdier, St Just-St Rambert (FR)

(73) Assignee: ALM, Ardon (FR)

( * ) Notice: Subject to any disclaimer, the term of this patent is extended or adjusted under 35 U.S.C. 154(b) by 0 days.

(21) Appl. No.: 09/559,479

(22) Filed: Apr. 27, 2000

(30) Foreign Application Priority Data

Apr. 28, 1999 (FR) .............................................. 99 05359

(51) Int. Cl.[7] .................................................. F21S 8/06
(52) U.S. Cl. ........................ 362/427; 362/288; 362/371
(58) Field of Search ................................. 362/269, 274, 362/371, 401, 402, 285, 287, 288, 427, 804; 267/175, 176

(56) References Cited

U.S. PATENT DOCUMENTS

| 2,632,660 A | * | 3/1953 | Krauthamer | ................ 362/427 |
| 3,942,751 A | | 3/1976 | Fay | |
| 4,314,319 A | * | 2/1982 | Terry et al. | .................. 362/371 |
| 4,427,382 A | | 1/1984 | Hoffmeister et al. | |
| 4,581,689 A | * | 4/1986 | Oram | .......................... 362/401 |

FOREIGN PATENT DOCUMENTS

| EP | 0 614 037 | 9/1994 |
| EP | 0 742 377 | 11/1996 |

* cited by examiner

Primary Examiner—Y. My Quach-Lee
(74) Attorney, Agent, or Firm—Young & Thompson

(57) ABSTRACT

The rotation of a first element (3), for example an arm carrying a lighting unit, with respect to a second element (2), about an axis (12), is limited in both directions, with an angular travel which can exceed 360 °, by an elastic element (13) comprising two coils wound in the same direction, each cooperating with a mobile stop piece integral in rotation with the first element (14, 15), the central part of the spring (13) cooperating with a fixed stop piece (16) integral with the second element (2)

11 Claims, 3 Drawing Sheets

FLEXIBLE STOP PIECE FOR LIMITING ANGULAR TRAVEL, ARTICULATED SYSTEM COMPRISING SUCH A STOP PIECE, AND MEDICAL EQUIPMENT COMPRISING SUCH AN ARTICULATED SYSTEM

FIELD OF THE INVENTION

The present invention relates to stop pieces for limiting angular travel about an axis of a first element with respect to a second element.

Many articulated systems use such elements which are movable in rotation with respect to one another.

For matters relating to the occupation of the surrounding space or the transmission of power, data or fluids, the angular travel between these elements must be limited, in both directions of rotation, by stop pieces.

BACKGROUND OF THE INVENTION

Conventionally, these stop pieces are rigid, which results, depending on the masses and speeds of displacement of the elements, in sudden stops against stop pieces, which generate vibrations and are very often noisy.

Furthermore, the repeated shocks and the inertias brought into play rapidly bring the safety of the system into question.

SUMMARY OF THE INVENTION

The purpose of the present invention is to propose a flexible stop piece providing limitation of angular travel without shocks between two elements and a progressive braking of the movement of relative rotation between these two elements, whilst eliminating the abovementioned disadvantages of fixed stop pieces.

In order to achieve this, according to one aspect of the invention, the first element comprises an inner part extending coaxially with respect to the axis of rotation in a sleeve part of the second element, the stop piece furthermore comprising an elastic element with two helical coils both wound in the same direction and one on each side of a central connecting zone, disposed concentrically between the inner part and the sleeve part, each coil being terminated with an end part, the sleeve part comprising a first stop zone capable of coming to bear against the central zone of the spring, the inner part comprising at least a second and a third stop zone, each capable of coming to bear against a corresponding end part of the elastic element.

According to other more particular characteristics of the invention:

- the second and third stop zones are offset angularly;
- each coil is disposed around the inner part such that it is normally slack;
- the end parts extend axially and/or radially.

The present invention also relates to an articulated system comprising at least one such flexible stop piece and typically at least one flexible pipe or conductor extending inside the first and second elements.

The present invention also relates to a medical equipment item comprising at least one such articulated system.

BRIEF DESCRIPTION OF THE DRAWINGS

Other characteristics and advantages of the present invention will emerge from the following description of particular embodiments, given by way of illustration but in no way limitative and given with reference to the accompanying drawings in which.

DETAILED DESCRIPTION OF THE INVENTION

Figure 1:
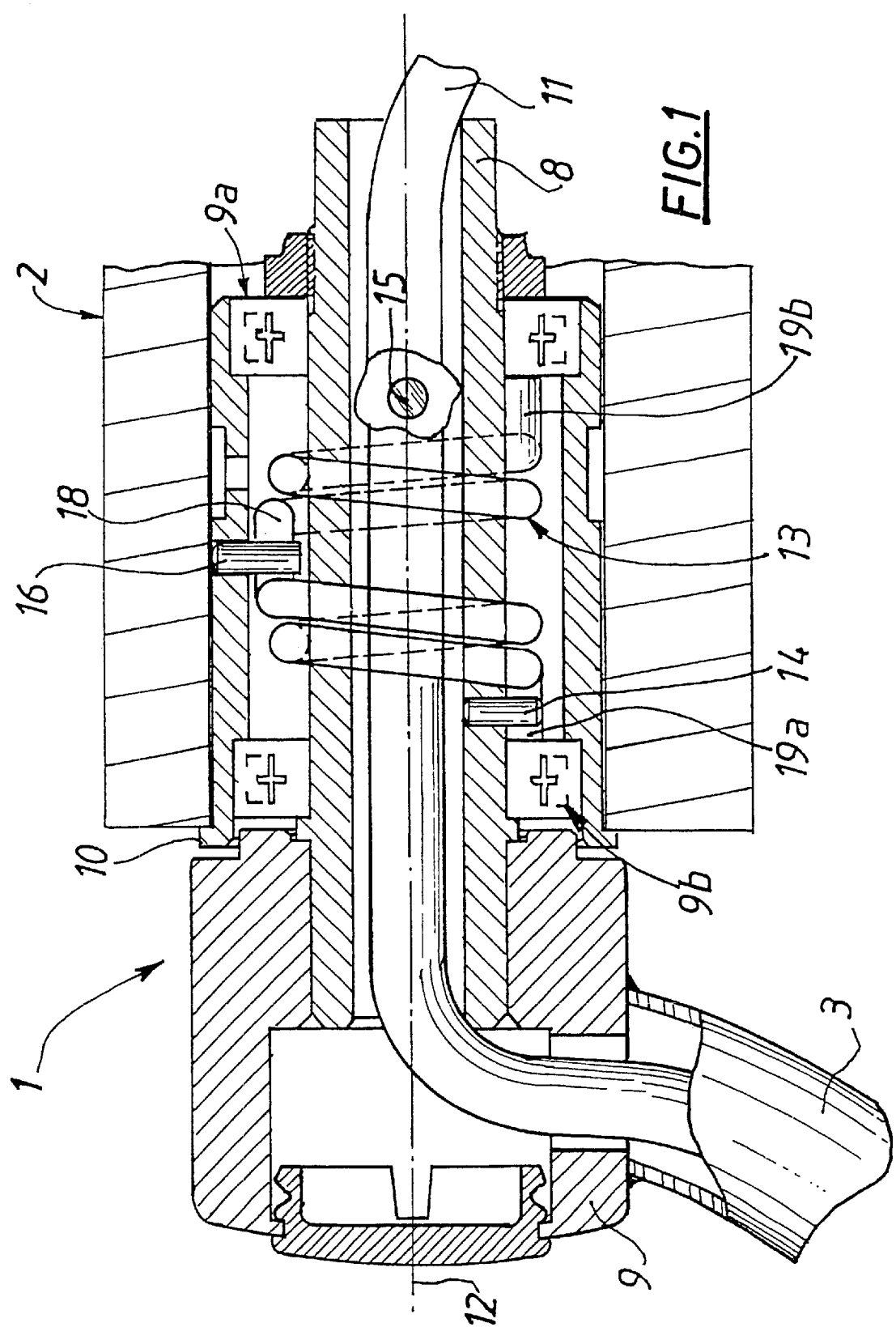
FIG. 1 is a longitudinal cross section of an articulation arrangement with a flexible stop piece according to the invention.

FIG. 1, snows an example of an articulation subassembly 1, incorporating a flexible stop piece according to the invention, between a first element 2 and a second element 3.

Figure 4:
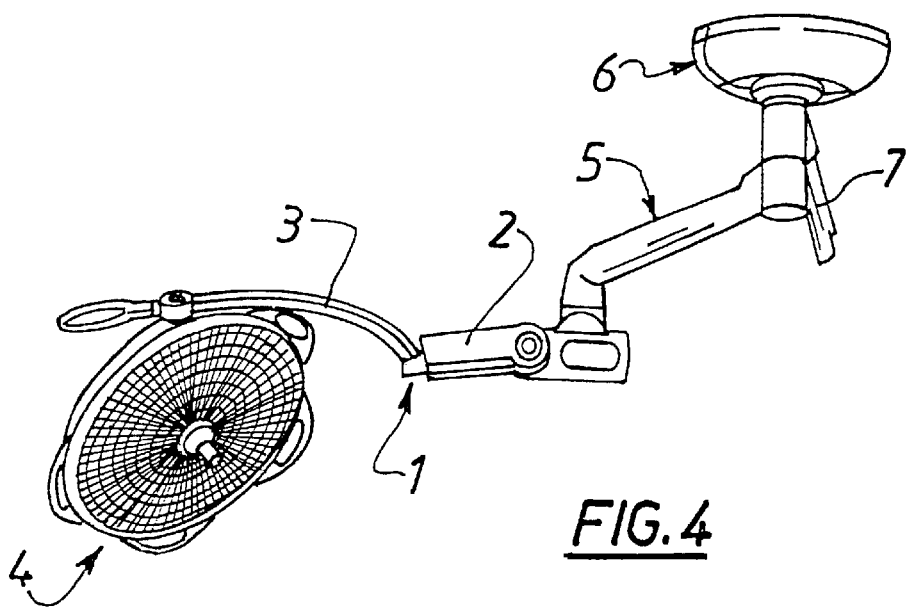
FIG. 4 is a diagrammatic view of a ceiling lighting unit incorporating a flexible stop piece according to the invention.

In the example of application shown in FIG. 4, the articulation subassembly with a flexible stop piece 1 is disposed between the base of an operational lighting 4 support arm 3 and an element 2. The support arm 3 is mobile in rotation with respect to the element 2, which is itself mounted in an articulated manner at the end of an arm 5 attached to a ceiling mount 6 which advantageously supports at least a second arm 7.

Returning to FIG. 1, the base of the arm 3 is fixed to a head 9 which is attached to a swivelling tubular element 8 by means of bearings 9a, 9b, in a sleeve 10 which is integral with the element 2.

According to one aspect of the invention, at least one cable 11 for carrying electrical current and/or for the transmission of digital, electrical or optical data, and/or at least one pipe for the transfer of medical fluid (oxygen, vacuum, etc.) runs in the arm 3, the tubular element 8, and beyond the latter, in the element 2.

The tubular element 8 and the sleeve 10 are coaxial with the axis 12. The rotation of the arm 3, about the axis 12 with respect to the element 2 is limited in a controlled manner by an elastic element with coils 13 cooperating selectively, as will be seen below, with stop pieces 14 and 15, carried by the tubular element 8, and 16, carried by the stationary sleeve 10.

Figure 2:
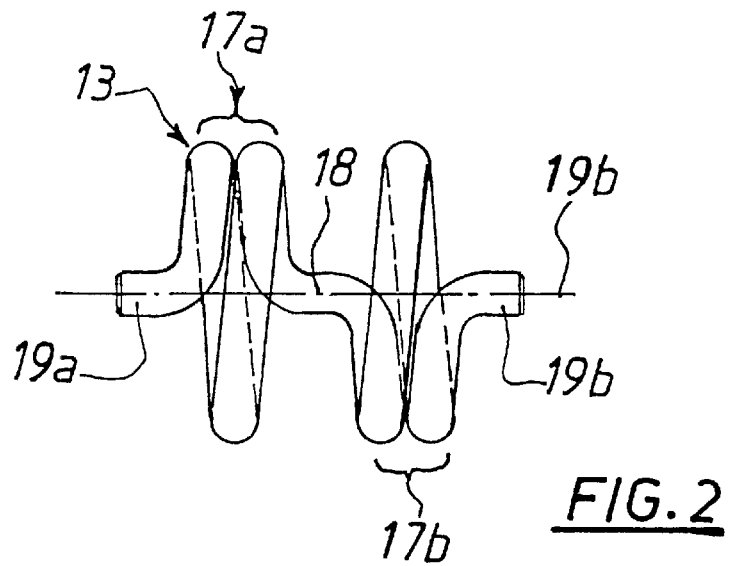
FIGS. 2 and 3 respectively are top and front views of the spring of the arrangement shown in FIG. 1.
Figure 3:
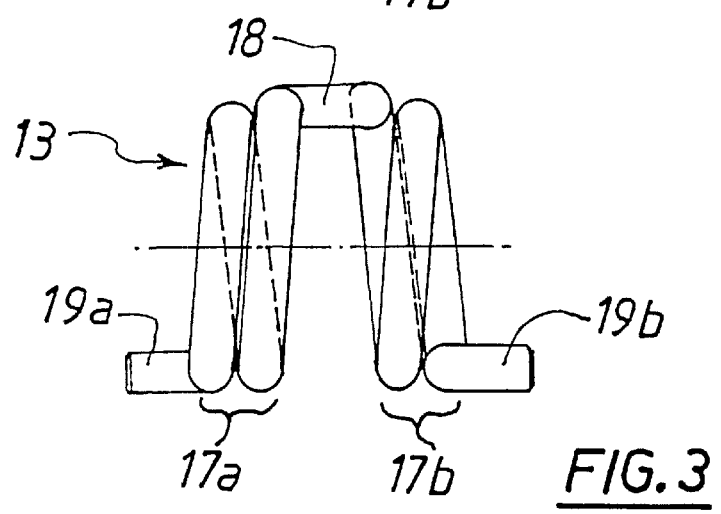

As can be seen more clearly in FIGS. 2 and 3, the elastic element 13 is typically made from steel spring wire and comprises two zones 17a, 17b coiled in the same direction connected by an intermediate connecting branch 18 extending in a plane which is tangential to the cylinder formed by the coiled zones 17a, 17b.

In the embodiment shown in FIGS. 1 to 4, each coiled zone forms a complete turn extended by a half-turn and is terminated at an axial end 19a, 19b, the axial ends 19a, 19b being substantially aligned with one another and diametrically opposed to the connecting branch 18.

Referring again to FIG. 1, the elastic element 13 is slipped loosely over the tubular element 8 between the latter and the sleeve 10, whilst being trapped by a pin forming a stop piece 16 mounted in the sleeve 10 and extending radially inwards between the two coils 17a, 17b in such a way as to cooperate selectively by lateral abutment with the intermediate branch 18 of the elastic element 13.

Similarly, two stop pieces 14 and 15 are mounted inside the tubular element 8 and extend radially outwards from the latter in order to cooperate selectively in lateral abutment with the axial ends 19a and 19b of the elastic member.

In this way, when the arm 3 rotates about the axis 12, with respect to the element 2, it causes the end of one of the coiled zones of the elastic element 13 to rotate, by means of the pin 14 if the rotation is in the clockwise direction or by means of the pin 15 if the rotation is in the anticlockwise direction.

When the amount of rotation becomes large, the central branch 18 of the elastic element 13 comes to bear against the stationary pin 16. From this moment on, the rotation of the tubular element 8 will begin to stress the elastic element, which will create an opposing torque progressively braking the movement of the arm until it is stopped completely.

The restitution of the energy stored in the elastic element 13 then brings the arm 3 backwards. The damping of the flexible stop piece can be adjusted by adjusting the stiffness of the elastic member 13.

As will be understood from the above, depending on the direction of rotation of the arm 3 and of the tubular element 8, only one coiled zone 17a or 17b of the elastic element 13 is stressed, the other coiled zone remaining unstressed.

The stressed coil is forced in the direction of the coiling and therefore in the direction of tightening the turns around the tubular element 8. Total damping is therefore achieved when all of the turns of this coil are tightened on the tubular element 8, thus eliminating any risk of exceeding the permissible stresses in the elastic element 13.

According to one aspect of the invention, as shown in FIG. 1, the pins 14 and 15 are angularly offset, typically by 90 degrees.

This offset makes it possible to fix the total angular travel of the arm. The offset pins arrangement according to the invention makes it possible to obtain angular travels greater than 360 degrees, which is generally impossible with the conventional systems with simple fixed stop pieces.

Figure 5:
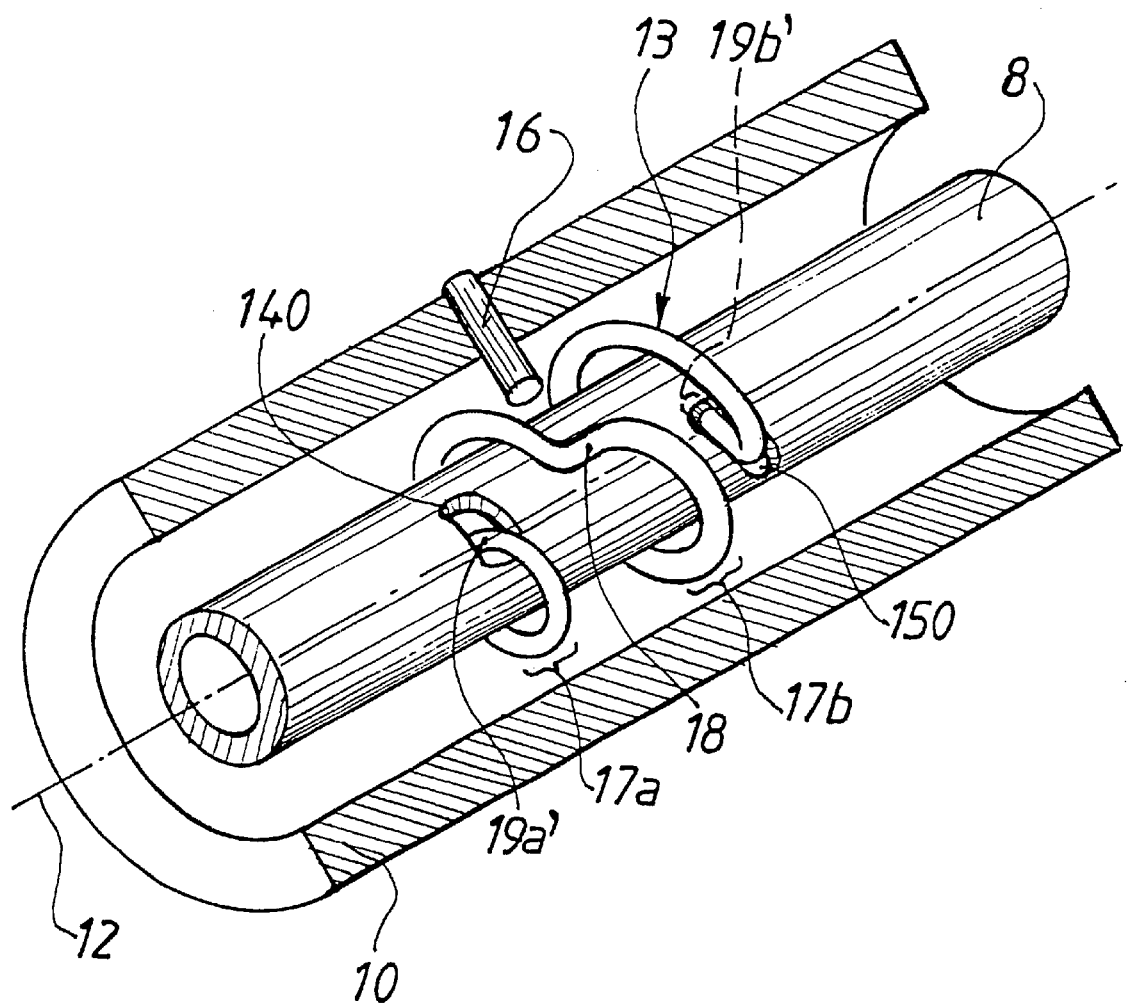
FIG. 5 is a diagrammatic view in perspective and in partial cross section of another embodiment of an articulated assembly with a flexible stop piece according to the invention.

In the simplified embodiment shown in FIG. 5, the coiled zones 17a and 17b of the elastic element 13 are limited to one turn and the stop zones integral with the inner tubular element 8 are in this case constituted by radial faces of angular openings 140, 150 formed in the tubular element 8 and into which the free ends, 19a and 19b penetrate, in this case folded back radially towards the inside of the elastic element 13. The angular offset sought between the stop zones is provided by an angular offset of the openings 140 and 150 and/or by the angular extension of the latter. The stop zone with the outer tubular element 10 is in this case constituted, as before, by a pin 16 extending radially inwards and fitted in a radial hole formed in the element 10.

Although the invention has been described with respect to a particular embodiment, it is not limited thereby but, on the contrary, is subject to modifications and variants which will be apparent to those skilled in the art in the context of the following Claims.

In particular, although one of its preferred applications is in suspended systems carrying medical equipment such as the lighting units mentioned above, operational microscopes, dispensing arms and mobile radiographic equipment, it can also be applied in other industrial fields for the general public, such as, for example, rotational heads for cameras or supports for rotating fans.

What is claimed is:

1. A flexible stop piece for limiting angular travel about an axis of a first element with respect to a second element, the first element comprising an inner part, extending coaxially with respect to said axis in a sleeve part of the second element, the flexible stop piece comprising an elastic element having two helical coils both wound in the same direction and one of the coils on each side of a central connecting zone, said elastic element disposed concentrically between the inner part and the sleeve part, each coil being terminated with an end part, the sleeve part comprising a first stop zone adapted to bear against the central zone of the spring, the inner part comprising at least a second and a third stop zone, each of the second and third stop zones adapted to bear against a corresponding end part of the elastic element.

2. The flexible stop piece according to claim 1, wherein each coil is disposed around the inner part such that it is normally slack.

3. The flexible stop piece according to claim 1 or wherein the second and the third stop zones are angularly offset.

4. The flexible stop piece according to claim 1 wherein the end parts extend substantially axially.

5. The flexible stop piece according to claim 1 wherein the end parts extend substantially radially with respect to the central zone.

6. The flexible stop piece according to claim 1, wherein at least one of the stop zones is constituted by a radial pin.

7. The flexible stop piece according to claim 5, wherein at least one of the stop zones is constituted by a cut-out in the inner part.

8. The flexible stop piece according to claim 1, wherein the inner part is tubular.

9. An articulated system comprising at least one flexible stop piece according to claim 1.

10. The articulated system according to claim 9, comprising at least one flexible pipe or conductor extending inside the first and second elements.

11. A medical equipment comprising at least one articulated system according to claim 1.

* * * * *